Jan. 9, 1951     C. B. DE VLIEG     2,537,517
METAL CUTTING TOOL
Filed Dec. 21, 1946
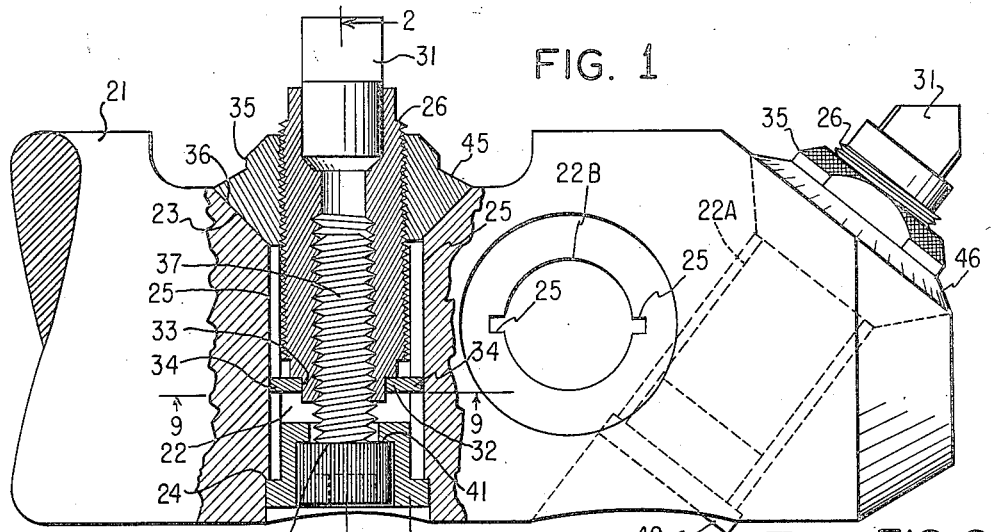
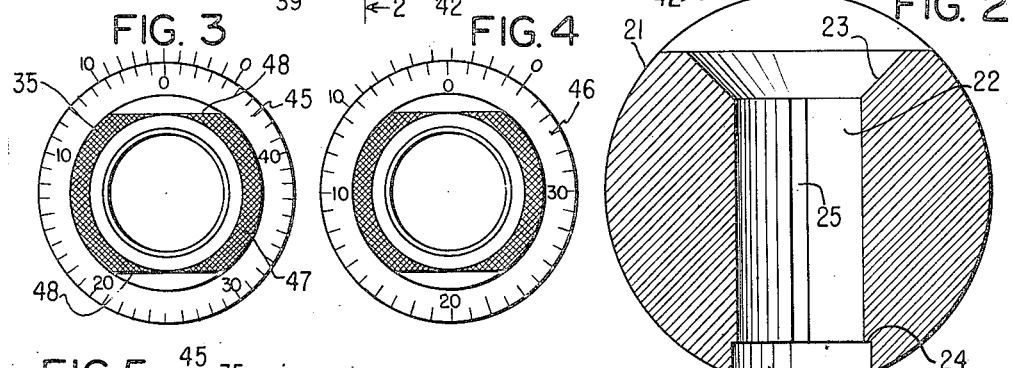
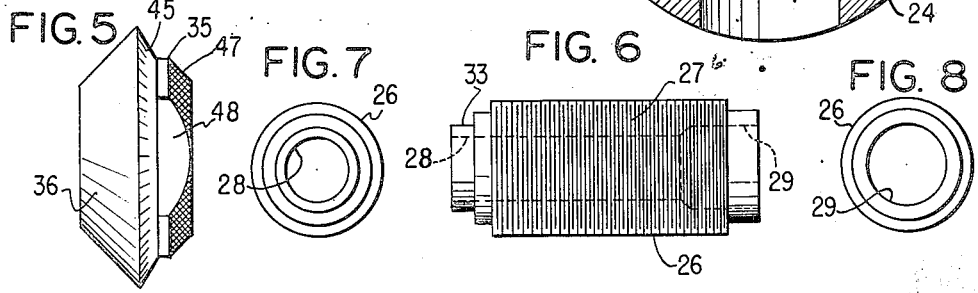
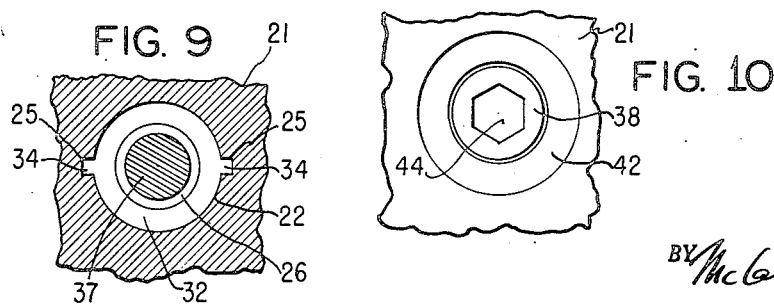
*INVENTOR.*
Charles B. DeVlieg
BY McKenna & Morsbach
Attorneys

Patented Jan. 9, 1951

2,537,517

UNITED STATES PATENT OFFICE 2,537,517

METAL CUTTING TOOL

Charles B. De Vlieg, Farmington, Mich.

Application December 21, 1946, Serial No. 717,731

5 Claims. (Cl. 77—56)

This invention relates to metal cutting tools, and more particularly to means for adjustably holding a cutting element on a support such as a boring bar or any tool holder. Specifically the present invention is an improvement on the arrangement disclosed and claimed in applicant's prior Patent 2,330,692.

In machine tool practice it is desirable, particularly in the art of tool making and precision manufacture, to maintain a high degree of accuracy and uniformity in the performance of metal cutting operations. It is frequently desired to make adjustments of a cutting tool to such minute settings as .0001". Prior constructions have not been altogether satisfactory for this purpose. It is an object of the present invention, therefore, to provide a new and improved metal cutting tool which will be thoroughly accurate and dependable in maintaining such fine increments of adjustment of a cutting tool element in its holder or support.

Another object of my invention is to provide improved means for holding a cutting tool element characterized by a graduated dial which is so constructed in coaction with its holder or support as to center itself with respect to the tool axis when tightened to a working position and which provides a rigid base abutment against tool action so that there can be no shift or displacement of the tool point from a predetermined set position.

Another object is to provide improved means for unlocking the cutting tool element from its setting and freely adjusting it to the predetermined position setting.

Another object is to provide improved means whereby relocking of the cutting tool element effects a centering and seating action in two conical seats, one between the graduated dial and its seat in the tool holder and the other between the dial and a cartridge element in which the cutting tool element is directly supported.

Another object is to provide a metal cutting tool of the character described adapted for application to different angular positions in a boring bar or other holder without change in construction of the individual parts other than the substitution of one dial for another, each dial having graduations properly designating the increments of adjustment in the respective angular positions.

As applied to a boring bar my invention provides also for the mounting of the cutting tool element in a manner to insure maximum rigidity and strength in a bar of given diameter, and it also provides for the application of a multiple of such tool mountings in a relatively small tool supporting area, as will be described more fully hereinafter.

Another object is to provide an improved metal cutting tool adapted for economical application to any of a large variety of machining operations, such as turning, boring, or multiple tooling, where a fine increment of dependable adjustment is required at a cutting point.

Other objects and attendant advantages will be appreciated by those skilled in this art as the invention becomes better understood by reference to the following description when considered in connection with the accompanying drawings, in which Figure 1 is a sectional view through a boring bar equipped with several cutting tools, each embodying my invention;

Figure 2 is a cross-section through the boring bar on the section line 2—2 of Figure 1, with the cutting tool cartridge or unit removed;

Figure 3 is a face view of the graduated dial used in the application shown in Figure 1 as applied to 90° position, also showing the vernier graduations;

Figure 4 is a similar face view of the graduated dial shown in Figure 1 as applied to the angular position at the right hand extremity;

Figure 5 is a side view of one of the graduated dials;

Figure 6 is a side view of the cutter housing or cartridge, removed from the assembly;

Figures 7 and 8 are views of the left and right hand ends, respectively, of the cutter housing shown in Figure 6;

Figure 9 is a section taken substantially on the section line 9—9 of Figure 1, and Figure 10 is a face view looking at the locking end opposite from the dial end.

Referring to Figure 1, the tool holder designated generally by 21, in this instance a boring bar, is equipped with two individual cutting tools embodying my invention. Each such tool is identical in construction (except for the cutting point). The tool at the left is at an angle of 90° with respect to the axis of the boring bar and the tool at the right is at an angle of 52° 8' with respect to said axis. The bar is provided with a through bore 22 for the first mentioned tool, a similar bore 22A for the second tool, and an intermediate bore 22B for a third similar tool (not shown), the latter bore being at 90° diametrically with respect to the bore 22. This illustrates the close proximity of mounting the tool units one with respect to another; and this is a distinct advantage where multiple tools are desired.

A description of the tool unit at the left will suffice as being typical of any of a variety of mountings. The bar is machined to provide a conical abutment surface 23 concentric with the bore at one end thereof. At the opposite end the bar is machined to provide a thrust shoulder 24. In the preferred embodiment the bar is further machined to provide diametrically opposed key slots 25 extending lengthwise along the bore and intersecting the surface 23 and the thrust shoulder 24. A cutter cartridge body or housing designated generally by 26 is externally threaded from end to end of its major cylindrical portion 27 as best shown in Figure 6, and this portion has a sliding fit in the bore 22. The cartridge body has a central bore from end to end, the portion 28 of the bore being threaded and the portion 29 being of sufficient diameter and length to receive the shank end of a cutter element 31. The cutter element preferably has a close fit in the bore 29 and is brazed therein so as to provide a rigid mounting equivalent to an integral structure. The cutter element 31 is preferably of tungsten carbide or other carbide steel of which there are a number of makes well known on the market. A washer type key 32 is pressed onto the reduced annular shoulder 33 of the cartridge body and is provided with key elements 34 which fit in the grooves 25, thereby retaining the cartridge body against rotative movement at any position in the bore. On the cartridge body 26 is rotatably mounted a graduated dial or collar designated generally by 35. The dial is preferably threaded directly to the body 26. This dial is shaped to provide a conical base surface 36 at an angle complemental to the surface 23 so that when the cartridge body is drawn inwardly axially of the bore the cone base of the dial will by its coaction with the cone surface 23 be accurately centered with respect to the axis of the bore and the corresponding axis of the cutter cartridge body. Means for so moving the cartridge body comprises a locking screw 37 having a screw body of substantial length threaded in the bore 28 and having a socket head 38 the shoulder 39 of which is adapted to seat against a shoulder 41 of a thrust collar 42. Upon tightening the screw 37 it serves to clamp its shoulder 39 against the collar 42 and the latter against the end shoulder 24. This pulls the cartridge body lengthwise inwardly into the bore. When the screw 37 is tightened the cartridge body pulls the cone face of the dial against the cone surface 23, thereby centering the graduated dial, as described. This tightening also forcibly clamps this dial against the base surface 23 and at the same time forcibly and rigidly clamps the cartridge body and its cutting element in the ultimate set position on the boring bar. In order to further obtain the desired centering and clamping effects, I use V-threads on the cartridge body, the external threads for the cartridge body being 40 per inch. It will be observed that a pitch of 40 threads has a lead of .025" per revolution. This means that one revolution of the dial in the tool setting at the left in Figure 1, will move the tool point .025" and in a boring or turning operation the diameter of the ultimate cut would measure .050" because there is a .025" cut at diametrically opposite sides of the center. The internal threads for the clamping and locking screw are 20 per inch, but the pitch of these threads is not critical. This arrangement gives fine and accurate adjustments when setting the dial and quick acting adjustments when unlocking and locking. The head 38 of the locking screw has a wrench socket 44 to receive a similarly shaped wrench or tool for tightening and locking the parts in the set position.

As shown in Figure 3, the dial face 45 is graduated from 0 to 50 in coaction with an 0 to 10 vernier graduation on the face of the boring bar. Each dial graduation spacing indicates .001". One revolution of the dial advances the tool cutter point .025", giving a cut of .050" measured diametrically, as above described. A tool unit according to my invention may be applied in a different angular relation on the boring bar (as in the position at the right in Figure 1) without change except as to the graduations on the dial. Here the dial 46 is provided with graduations 0 to 40 (as shown in Figure 4), and one revolution of the dial advances the tool cutter point .020", giving a cut of .040" measured diametrically, and each spacing on the dial indicating .001" as in the case of the graduations on the dial 35. This result can be demonstrated mathematically, given the angular position of the cutter unit axis as 52° 8' with respect to the axis of the boring bar. This is particularly advantageous because the same cartridge parts and dials of the same construction can be used in different angular settings, the dials differing only in their respective graduations. Each dial is preferably shaped to provide a knurled portion 47 and flat faces 48 to facilitate manipulating the dial when making settings.

Assuming the tool is locked in the set position shown at the left in Figure 1 and it is desired to advance the cutting point a given distance, the first operation is to unlock the parts by loosening the screw 37—38. This permits free turning of the dial 35 to the number of thousandths or fractions thereof desired. The key 32 holds the cartridge against rotative displacement during this dial setting. Upon tightening the screw 37—38 the parts will be locked together as an integral structure. This tightening and locking will most accurately center the cutting tool precisely to its previous relationship to the bore. Also the cutting point will be most accurately adjusted radially the precise distance indicated by the dial setting. The parts are so proportioned and coact in such manner as to provide maximum strength and rigidity with relation to a boring bar or holder of given size. Also, the parts are so designed as to permit of machining at comparatively low cost. Another advantage is that there are no objectionable side thrusts or angular forces which tend to distort and displace the parts from the desired precision settings. The comparatively long cartridge mounting, the length of the dial mounting on the cartridge body, and the relation of these to the cone base of the dial are factors in assuring ideal rigidity and a high degree of precision.

It will be manifest to those skilled in this art that the invention may be applied to a variety of cutting operations, including boring, turning, and multiple tooling. Also, it will be manifest that changes and modifications may be made without departing from the spirit and scope of the invention as expressed in the appended claims, in which—

I claim:

1. A cutting tool of the character described comprising a tool holder body having a through bore provided with diametrically opposed key slots from end to end, a conical socket in the body at one end of the bore and a thrust shoulder at the opposite end, said socket having a conical abutment surface on an axis accurately coaxial and concentric with respect to the longitudinal axis of said bore, a cutter cartridge unit peripherally threaded substantially from end to end having a bore in one end in which a cutter element is adapted to be fixed and a threaded bore in the opposite end, and having a key member fixed to said opposite end and provided with diametrically opposed key elements adapted to fit in said key slots, a dial member threadably engaged on the cartridge unit and having a conical base complemental to the conical socket, and locking means threadably engaged in said cartridge bore and acting against said thrust shoulder to cause the dial member and the cartridge unit to be centered and rigidly clamped in the tool holder.

2. A cutting tool, comprising a tool holder body having a bore therein, a cylindrical cutter housing slidably fitting in said bore and having a cutting element on one end, said cutter housing being threaded on its peripheral surface, said body having a conical abutment surface at one end of said bore accurately coaxial and concentric with respect to the axis of said bore, an adjusting member threaded directly on said cutter housing and having a conical surface complemental to said abutment surface and being accurately coaxial and concentric with the longitudinal axis of said cutter housing, means preventing rotative movement of the cutter housing in the body but permitting said slidable movement of the cutter housing lengthwise in the bore, and retaining means threaded in said cutter housing at its end opposite from its cutting element and coacting with said body and rotatively operable in one direction to pull the cutter housing axially in said bore to forcibly clamp said adjusting member through its conical surface against said abutment surface and thereby accurately center said adjusting member with respect to the longitudinal axis of said bore and also to rigidly clamp said cutter housing to said body, said retaining means being rotatively operable in the other direction to loosen said parts and permit rotative movement of said adjusting member for the purpose of adjusting the cutting element axially a predetermined degree to a reset position, and whereby upon operation of said retaining means to rigidly clamp the parts as aforesaid said cutting element will be rigidly clamped in said reset position in the identical relationship as in its previous set position with respect to the longitudinal axis of the bore.

3. A cutting tool as set forth in claim 2, in which the adjusting member is in the form of a dial, and measurement graduations between the dial and the body for visually indicating accurate rotative settings of the dial.

4. A cutting tool, comprising a tool holder body having a transverse bore therein terminating at one end in an outwardly diverging conical abutment surface accurately coaxial and concentric with respect to the axis of said bore and terminating at the opposite end in an annular thrust shoulder angular with respect to said bore axis, said bore having one or more key grooves parallel with its axis and intersecting said abutment surface and said thrust shoulder, a cylindrical cutter housing slidably fitting in said bore and having a cutting element on one end, said cutter housing being threaded on its peripheral surface, said body having a conical abutment surface at one end of said bore accurately coaxial and concentric with respect to the axis of said bore, an adjusting member threaded directly on said cutter housing and having a conical surface complemental to said abutment surface and being accurately coaxial and concentric with the longitudinal axis of said cutter housing, a key on the cutter housing having one or more key members slidably fitting in the said key groove or grooves to prevent rotative movement of the cutter housing in the body but permitting said slidable movement of the cutter housing lengthwise in the bore, and retaining means threaded in said cutter housing at its end opposite from its cutting element and cooperable with said thrust shoulder and rotatively operable in one direction against said thrust shoulder to pull the cutter housing axially in said bore to forcibly clamp said adjusting member through its conical surface against said abutment surface and thereby accurately center said adjusting member with respect to the longitudinal axis of said bore and also to rigidly clamp said cutter housing to said body, said retaining means being rotatively operable in the other direction to loosen said parts and permit rotative movement of said adjusting member for the purpose of adjusting the cutting element axially a predetermined degree to a reset position, and whereby upon operation of said retaining means to rigidly clamp the parts as aforesaid said cutting element will be rigidly clamped in said reset position in the identical relationship as in its previous set position with respect to the longitudinal axis of the bore.

5. A cutter cartridge unit of the character described comprising a cylindrical body peripherally threaded throughout the major portion of its length, the body being bored at one end to receive a cutting element, a cutting element fixed in said bore, the body being bored at its opposite end and the latter bore being threaded, the body having a reduced annular shoulder at its said opposite end, and a washer type key seated on said shoulder and fixed to the body, the key having one or more key elements projecting radially beyond the peripheral threads.

CHARLES B. DE VLIEG.

REFERENCES CITED

The following references are of record in the file of this patent:

UNITED STATES PATENTS

| Number | Name | Date |
| --- | --- | --- |
| 1,766,504 | Birkenmaier | June 24, 1930 |
| 2,330,692 | De Vlieg | Sept. 28, 1943 |
| 2,367,841 | Monroe | Jan. 23, 1945 |